(12) United States Patent
Shen et al.

(10) Patent No.: US 7,516,116 B2
(45) Date of Patent: Apr. 7, 2009

(54) RANGE AND COVER QUERIES IN OVERLAY NETWORKS

(75) Inventors: Guo Bin Shen, Beijing (CN); Changxi Zheng, Chongqing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 11/279,003

(22) Filed: Apr. 7, 2006

(65) Prior Publication Data

US 2007/0239759 A1   Oct. 11, 2007

(51) Int. Cl.
G06F 7/00   (2006.01)

(52) U.S. Cl. .......................................... 707/2
(58) Field of Classification Search .............. 707/1, 707/2, 3
See application file for complete search history.

(56) References Cited

U.S. PATENT DOCUMENTS

| | | | |
|---|---|---|---|
| 6,760,306 B1 | 7/2004 | Pan et al. | |
| 6,912,622 B2 | 6/2005 | Miller | |
| 6,917,954 B2 | 7/2005 | Ahmad et al. | |
| 7,039,634 B2 * | 5/2006 | Xu et al. | 707/3 |
| 7,313,565 B2 * | 12/2007 | Zhang et al. | 707/101 |
| 2004/0054807 A1 | 3/2004 | Harvey et al. | |
| 2004/0064693 A1 | 4/2004 | Pabla et al. | |
| 2004/0181511 A1 | 9/2004 | Xu et al. | |
| 2004/0205242 A1 * | 10/2004 | Xu et al. | 709/245 |
| 2004/0210624 A1 * | 10/2004 | Andrzejak et al. | 709/201 |
| 2004/0260799 A1 | 12/2004 | Bates et al. | |
| 2005/0021758 A1 | 1/2005 | White | |
| 2005/0198290 A1 | 9/2005 | Berkey et al. | |
| 2005/0243740 A1 | 11/2005 | Chen et al. | |

OTHER PUBLICATIONS

Baquero, et al., "B+ Trees on P2P: Providing Content Indexing Over DHT Overlays" Available at http://gsd.di.uminho.pt/members/nal/pubs/btp2p-techrep.pdf.
Zhu, et al., "Efficient, Proximity-Aware Load Balancing for Structured P2P Systems", Available at http://csdl2.computer.org/comp/proceedings/p2p/2003/2023/00/20230220.pdf.

* cited by examiner

Primary Examiner—Charles Rones
Assistant Examiner—Fazlul Quader
(74) Attorney, Agent, or Firm—Lee & Hayes, PLLC

(57) ABSTRACT

System and methods for range and cover queries in overlay networks are described. In one aspect, respective node intervals [s, t] of multiple node intervals are allocated to corresponding nodes in a segment tree. Each integer s and t corresponding to an index to a sorted array of possible endpoints of the node intervals. Each node in the segment tree corresponds to a particular computing device (peer) of multiple computing devices in an overlay network. A node interval [s, t] is assigned to a particular peer associated with a key. This assignment provides a connection between node interval structural information of the segment tree and an underlying structure-less routing substrate in the overlay network. The segment tree is distributed across the peers for query operations over DHT.

18 Claims, 3 Drawing Sheets

US 7,516,116 B2

RANGE AND COVER QUERIES IN OVERLAY NETWORKS

BACKGROUND

Overlay networks permit designers to implement customized routing and packet management algorithms on top of the Internet. Overlays use Internet paths between end-hosts as links upon which the overlay routing information, building a network on top of the network. Routing and storage and lookup overlays have become a substrate upon which a number of large distributed systems are based. For example, many peer-to-peer (P2P) systems have in overlay network at their core, presenting a hash-table-like "get (key)/set (key, value)" interface. Such overlays are structured and called distributed hash tables (DHTs). In other words, DHTs represent a class of decentralized distributed systems that partition ownership of a set of keys among participating nodes in a network. DHTs are used by the network nodes to route messages (e.g., queries) to the unique owner of any given key. There is one basic operation in DHT systems, lookup (key), which returns the identity (e.g., the IP address) of the node storing an object with that key. This enables nodes to insert, retrieve, and delete data items based on their respective key. State of the art DHT-based P2P system designs typically achieved key lookup at O(logN) complexity with each node maintains O(logN) states of other nodes.

DHTs can directly support only exact-match lookups (i.e. queries). As a result, DHT search operations are substantially limited. For instance, a range query, which is a query to find all objects associated with keys in a certain range over an underlying P2P network (i.e., a range query asks for all objects with values in a certain range), is difficult to directly achieve via DHT lookup. This is because a cryptographic hash function (e.g., SHA hash) strips the structural properties on keys to distribute keys uniformly. As a result, ordering among keys is not reliable.

SUMMARY

Systems and methods for range and cover queries in overlay networks are described. The systems and methods utilize a segment tree representing ranges to distribute responsibility for maintaining node intervals within ranges represented by the segment tree across participating peers in the network for range and cover queries. In one aspect, respective node intervals [s, t] of multiple node intervals are allocated to corresponding nodes in a segment tree. Each integer s and t corresponds to an index to a sorted array of possible endpoints of the node intervals. Each node in the segment tree corresponds to a particular computing device (peer) of multiple computing devices in an overlay network. A node interval [s, t] is assigned to a particular peer associated with a key. This assignment provides a connection between structural information among node intervals of the segment tree and an underlying structure-less routing substrate in the overlay network. The segment tree is assigned to respective ones of the peers and collaboratively maintained by the peers for query operations over DHTs.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
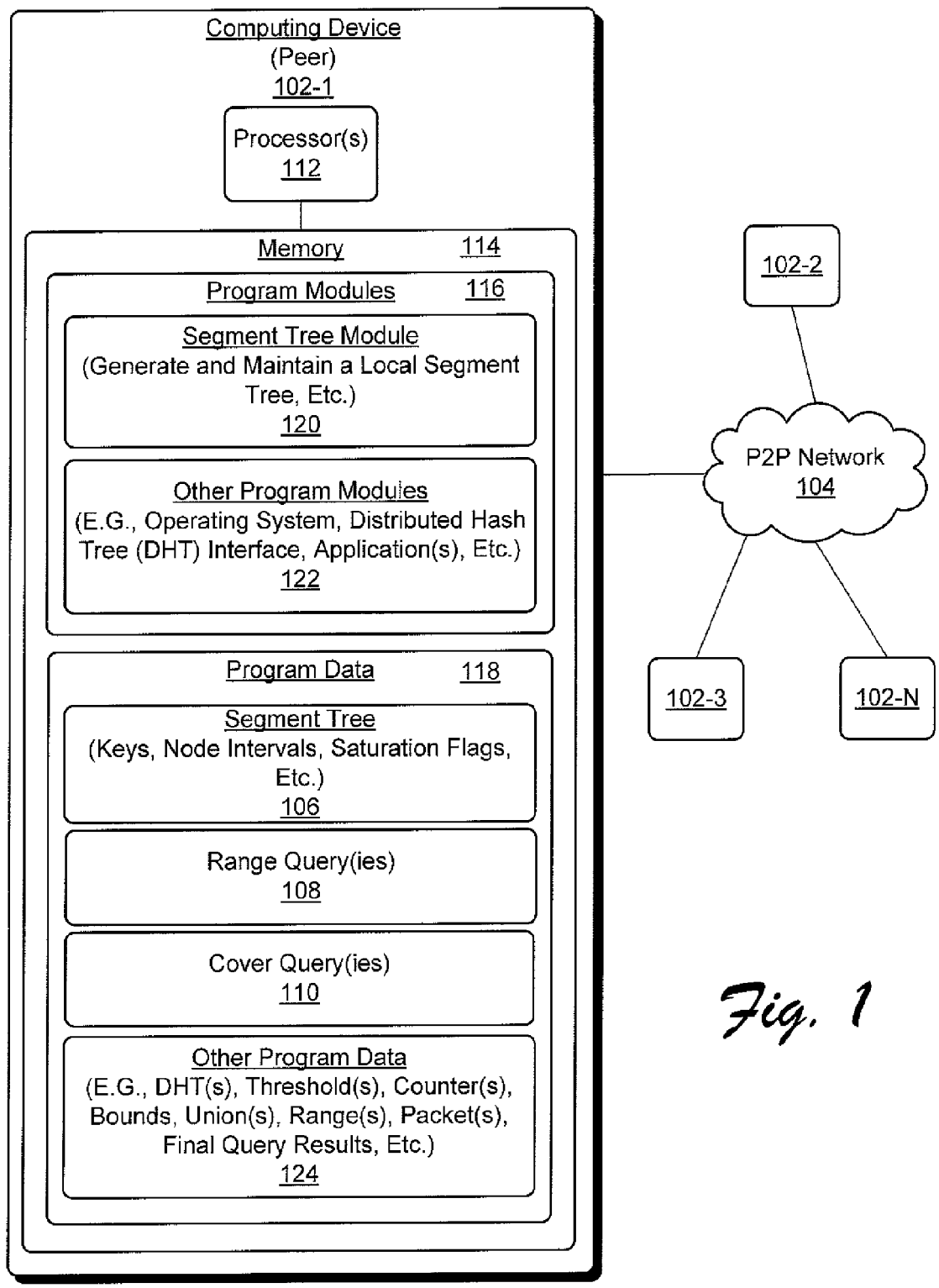
FIG. 1 shows an exemplary system for range and cover queries in overlay networks, according to one embodiment.

In contrast to conventional systems, which do not support cover queries using DHT lookup, the systems and methods described below with respect to FIGS. 1 through 3 for range and cover queries and in overlay network uniformly support both range and cover queries using DHT lookup. A range query is a query to find all objects associated with keys in a certain range over a network. A cover query is a query that is directed to locate all ranges currently in the network that cover a given key. A cover query has a dualistic relationship to a range query. For instance, keys inserted in a range query correspond to a given query point in a cover query. Additionally, ranges inserted in a cover query correspond to a queried range in a range query. In one implementation, the systems and methods using a segment tree over DHT invoke underlying DHT operations ("get" (remove), "put" (insert), "lookup" etc) in parallel so that range and/or cover queries are achieved at close to O(1) complexity for moderate ranges. In another implementation, queries of sub-ranges are executed in parallel.

The systems and methods use a segment tree used to support range and cover queries in overlay networks. The segment tree is a full binary tree that is collaboratively maintained across. DHT network peers such that a node interval [s,t] in the segment tree is assigned to a peer in the network that is associated with a key (e.g., a key Hash ([s,t], etc.). This assignment reestablishes an implicit connection between structural information (node intervals) of the segment tree and the underlying structure-less routing (due to hash operations) substrate in the network provided by DHT. As such, the segment tree provides a highly regular architecture where peers associated with intermediate and leaf nodes in the segment tree are each responsible for certain keys. This regularity of the segment tree allows each peer to calculate a union of minimum sub-ranges that match a given range. This means that any peer can use DHT lookup operation to find the responsible node of each subrange at O(1) complexity by utilizing the structural information. As such, using underlying DHT routing mechanisms, the segment tree is used to distribute responsibilities for node intervals of the segment tree to respective DHT nodes that are associated with a key.

In contrast, in a conventional trie-based structure of Prefix Hash Tree (PHT) that is also built over DHT, keys are stored only at the leaf nodes in the PHT that share the same prefix. In this scenario, the node (i.e., a client) has no knowledge about the structure of the whole PHT, and the node has to undertake additional DHT get operations to reach leaf node(s) with the longest matched prefix. As a result, for an N-bit key using a PHT, the complexity is O(logN) using binary search, which is intrinsically sequential and time consuming.

We now describe further details of the systems and methods for range and cover queries in overlay networks.

An Exemplary System

Although not required, systems and methods for range and cover queries in overlay networks are described in the general context of computer-executable instructions (computer-program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system too for range and cover queries in an overlay network, according to one embodiment. System 100 includes peer computing device (peer or DHT node) 102 coupled to other computing devices (peers) 102 over network 104. For example, peer 102-1 is coupled to peers 102-2 through 102-N over network 104. Network 104 is a P2P structured overlay network that utilizes DHTs to partition ownership of a set of keys across peers 102. Each peer 102 includes a respective processor coupled to memory that comprises computer-program modules and program data. The processor(s) are configured to fetch and execute computer-program instructions from the computer-program modules to use a distributed segment tree 106 that is collaboratively maintained by respective peers 102 for range query 108 and cover query 110 support.

For example, peer 102-1 includes one or more processors 112 coupled to a memory 114. Memory 114 can be any type of memory such as a system memory that comprises computer-program modules 116 and program data 118. Program modules 116 include, for example, segment tree management module 120 and other program modules 122. Segment tree management module 120 locally generates a segment tree 106. Segment tree management module 120 uses the segment tree 106 to calculate related node intervals, maintain information of a specific node interval if a key associated with peer 102-1 corresponds to a specific node interval (every DHT peer/node 102 is responsible for very specific segment tree node intervals), and respond to insert and/or delete queries received from other peers (the queries corresponding to a specific node interval). Program modules 116 also includes other program modules 122 such as an operating system, application(s) leveraging the segment tree 106 to generate and communicate cover queries 110 and/or range query's 108 over DHTs to other peers (e.g., peers 102-2 through 102-N), etc. Such applications include for example, one or more of streaming applications, download applications, etc.

We now describe an exemplary segment tree 106 data structure.

Exemplary Distributed Segment Tree Structure

Figure 2:
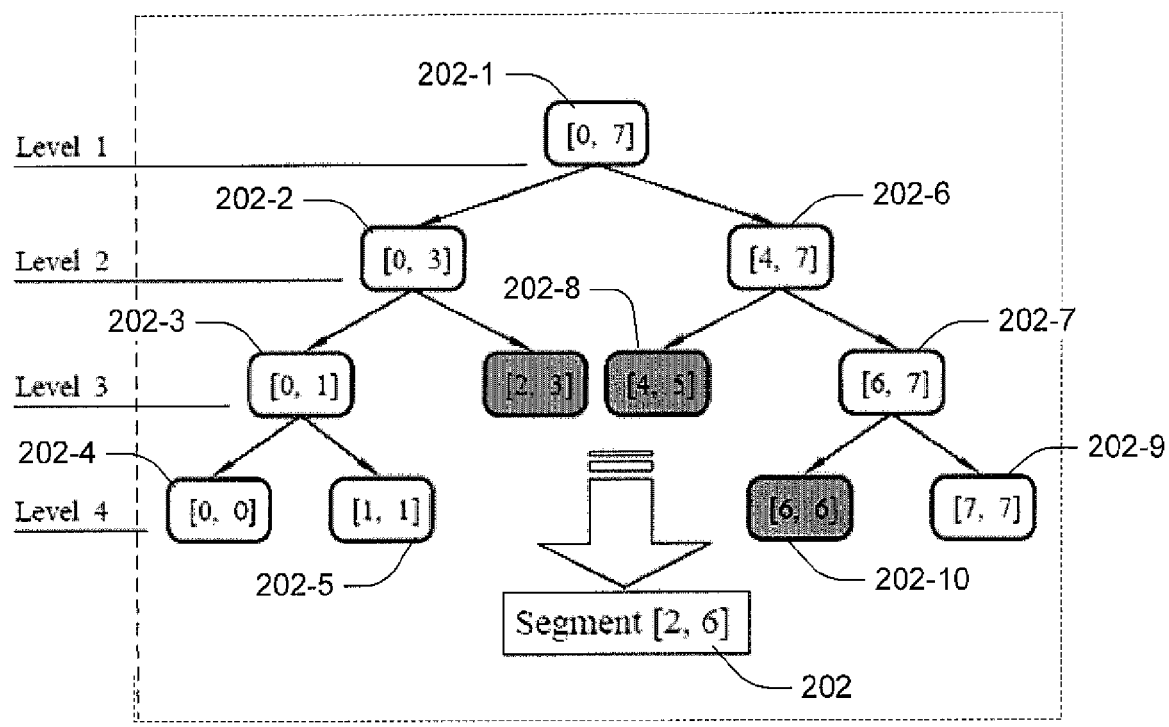
FIG. 2 shows an exemplary segment tree for range and cover queries, according to one embodiment.

FIG. 2 shows an exemplary segment tree 106 for range and cover queries in overlay networks, according to one embodiment. For purposes of exemplary illustration and description, aspects of FIG. 2 are described with respect to corresponding components of FIG. 1. (In the description, the left-most digit of a component reference number identifies the particular Figure in which the component first appears). Referring to FIG. 2, segment tree 106 includes multiple nodes 202. In this exemplary implementation, the segment tree 106 has a range of [0,7] and an optimal representation of range [2,6] via three sub-ranges.

In this implementation, segment tree 106 is a binary search tree with the following data structure:

Segment tree 106 has a range of length L (henceforth the range is called segment tree range) and a height H=log L+1.

Each node 202 represents a node interval $[s_{l,k}, t_{l,k}]$, wherein s and t represent integers, ($l \in [0, \log L]$ and $k \in [0, 2^l - 1]$), with a length of $l_{l,k} = t_{l,k} - s_{l,k} + 1$. Each integer corresponds to an index to a sorted array of possible endpoints of a set of intervals. The root node interval equals the segment tree range and leaf node interval is one.

Each non-leaf node 202 has two children nodes 202. The left child node 202 and the right child node 102 represent the intervals $$\left[ s_{l,k}, \left\lfloor \frac{s_{l,k} + t_{l,k}}{2} \right\rfloor \right] \text{ and } \left[ \left\lfloor \frac{s_{l,k} + t_{l,k}}{2} \right\rfloor + 1, t_{l,k} \right],$$

respectively. The union of the node intervals associated with the two children nodes 102 covers the same interval associated with the parent node 202.

For neighboring nodes 202 on a same layer, there is $s_{l,k} - (t_{l,k-1} + 1)$ for any $k \in [1, 2^l - 1]$, providing continuity of the segment tree 106.

All the nodes 202 from a same layer (e.g., levels 1-4) span the entire range of the segment tree 106. That is, $$U_{k=0}^{k=2^l-1} [s_{l,k}, t_{l,k}] = L$$

for any $l \in [0, \log L]$. This property ensures the integrity of the segment tree.

FIG. 2 illustrates an exemplary segment tree 106 with the above described properties, and with a range of [0,7] (i.e., L=8), according to embodiment. In a different implementation, the segment tree 106 has a different range and the sub-range configuration.

Theorem 1: Any segment with a range, (R≦L), can be represented by a union of some node intervals on the segment tree 106. There exist multiple possible unions for any range with R>1. Since segment tree 106 is a full binary tree, it is trivial to prove the first half of the theorem. For example, in one implementation, segment [2,6] is represented by the union of intervals [2,3], [4,5] and [6,6], as shown in FIG. 2. The second half of the theorem is evident from the third property of segment tree 106. Although there are multiple possibilities to represent a larger range with unions of smaller sub-ranges, the following theorem ensures the existence of the optimal representation.

Theorem 2. Any segment with a range R, (R≦L), can be expanded by a union of no more than 2 log R node intervals.

Proof: For a given segment S, suppose the longest part on S represented by a single node 202 is P, then the left part to P should always be represented by the right children 202 on the segment tree 106, and the right part should be represented by the left children 202. There are at most log R consecutive left children 202 on the tree and at most log R consecutive right children 202. So a segment can be represented at most 2 log R nodes 202 on the tree 106.

Distributing Responsibilities to Maintain Node Intervals

A peer 102 (FIG. 1) distributes responsibilities of maintaining node intervals of the segment tree 106 by causing other respective peers 102 (peers 102 are also referred to as DHT nodes 102) to locally generate and maintain a local copy of the segment tree 10.6. To this end, the peer 102 utilizes segment tree module 120 to delegate a respective node interval [s,t] to respective ones of the DHT nodes 102 across a network 104. These delegations provide a connection between node interval structural information of the segment tree 106 and an underlying structure less routing substrate associated with the network 104, where the structural properties are stripped from the keys due to hash operations. Consequently, both range query and cover query can be achieved using the segment tree 106.

The peer 102 communicates the respective node intervals to corresponding ones of the DHT nodes 10.2 along with an indication of the range of the segment tree 106. Responsive to receiving this information, a DHT node 102 locally reconstructs the segment tree 106. Thus, information about any node 102 of the segment tree can be located via a DHT lookup operation. After responsibilities of maintaining node intervals have been distributed across respective DHT nodes 102 (i.e., a respective segment tree has =been locally generated at each respective computing device 102), the segment tree 106 can hereinafter be referred to as a distributed segment tree (DST).

The peers 102 each respectively maintain the locally constructed segment tree 106 via key insert and/or removal operations and respond to range 108 and/or cover 110 queries (e.g., via DHT lookup). The insert and remove operations are now described with respect to range queries and cover queries.

Range Query

Given a range [s,t], a range query 108 generated by a peer 102 and submitted to system 100 results in the peer 102 receiving, from corresponding different peers 102, all the keys that belong to the specified range and are currently stored on network 104. Insert and remove key maintenances mechanisms implemented by a peer 102 to maintain a locally constructed segment tree 106 are now described.

Key Insertion, Segment Tree Distribution, and Key Removal

The basic operation of insertion is for a peer 102 to insert a given key to a specific leaf node 202 (the specific leaf node 202 being determined by DHT) and all ancestors of that leaf node to 202. This is because the node interval of any ancestor node 202 covers the given key. In other words, a peer 102 inserts the key to all the nodes 202 whose interval covers the given key. For purposes of exemplary illustration, such key(s) are shown with respect to a peer 102 (FIG. 1) as respective portions of "other program data" 124.

As described above, and since the segment tree 106 is a full binary tree, every peer 102 on network 104 can locally reconstruct the segment tree 106 as long as it knows the range of the segment tree 106. In other words, a node can calculate the specific leaf node for a given key and all ancestors of that node. This is feasible for an application, for example, by taking the whole range of key space (which could be very large) as the segment tree range. As a result, in one implementation a key can is inserted to a leaf node 102 and all its ancestors simultaneously in parallel. According to segment tree properties, if up to H (=log L+1, with L being maximum segment range) parallel threads can be executed concurrently for the insertion, then O(1) complexity can be achieved via such parallelism.

Node interval on the segment tree 106 increases exponentially against levels (e.g., levels 1-4 of FIG. 2). In an extreme case, a root node 202 (FIG. 2) is responsible for the whole range of the segment tree 106. In view of the described key insertion scheme, the load on nodes 202 across levels is unbalanced. On the other hand, the keys maintained by a parent node 202 are purposefully redundant. To balance the load on nodes across levels, segment tree management module 120 limits the number of keys that a non-leaf node 202 needs to maintain. In one implementation, the number of keys that a non-leaf node needs to maintain is determined using a downward load stripping mechanism. The downward load stripping mechanism evaluates a threshold constraint ($\gamma$) to limit the number of keys that a non-leaf node 102 needs to maintain.

In one implementation, the downward load stripping mechanism works as follows. Each node 202 in segment tree 106 maintains two counters a left counter and a right counter. If a key put by a peer 102 to a node 202 can also be covered by a left child node 202, the left counter is increased by one. Otherwise, the right counter is increased by one. If a node's left or right counter reaches the threshold, the peer 102 associated with the node 200 to being modified generates a corresponding left or right saturation event. If the insertion of a key triggers either left saturation or right saturation, the key put 6 to the node 202 is discarded. Such discarding is acceptable because, as described above, the parent node 202 maintains a redundant key for improved query efficiency. However, a query 108 over the parent node's interval is then split by the query and application (e.g., see "other program modules" 124) into two range queries 108 over the intervals associated with the two children nodes. In one implementation, query splitting operations are executed in parallel. By reducing redundancy embedded in the segment tree 106, the downward load stripping mechanism achieves very good tradeoff between load and performance, while not negatively impacting correctness of the query.

Removing a key from the segment tree 106 is analogous to the key insertion process described above. That is, the key is removed from a leaf node 202 and all its ancestor nodes 202. In one implementation, such removal operations are executed in parallel. Key removal operations may cause a saturated node 202 to become unsaturated. In such a scenario, the node 202 may recruit an additional key from its children node(s) 202. If no additional key is recruited, the node 202 marks itself as unsaturated. In one implementation, key recruitment is performed lazily. For example, the key recruitment does not need to be performed immediately after the node 202 becomes unsaturated. Rather, the system can flexibly determine a proper time, such as when the system load is low, to recruit additional keys from its children to perform key recruitment.

Key redundancy on multiple intermediate nodes 202 in the segment, tree 106 allows keys maintained on a node 202 to be recovered based on the keys on its children node(s) 202. As a result, a range query 108 on a failed and non-recovered peer 102 associated; with a node 202 can be replaced by two queries 108 on children node(s) 202 of the node 202. In one implementation, acquires are performed in parallel.

Given a range [s,t] under a query 108, the peer 102 splits the range into a union of minimum node intervals of segment tree 106, using a range splitting algorithm to split an: arbitrary given range into minimum number of segment tree node intervals to optimize query/insert operations. An exemplary range splitting algorithm is shown below in TABLE 1.

TABLE 1

EXEMPLARY RANGE SPLITTING ALGORITHM

```
// Parameters:
// s,t: bounds of input segment
// lower,upper: bounds of current node interval
// ret: resulting union of node intervals
SplitSegment(s, t, lower, upper, ret)
    if s≦lower AND upper≦t then
        ret.add(interval(lower, upper));
        return;
    mid←(lower + upper) / 2;
    if s≦mid then
        SplitSegment(s, t, lower, mid, ret);
    if t>mid then
        SplitSegment(s, t, mid+1, upper, ret);
```

After a peer 102 splits the range into a union of minimum node intervals of segment tree 106, the peer 102 uses DHT "get," to retrieve the keys maintained on the corresponding peers 102. The final query result is the union of the keys returned. In one implementation, DHT "get" operations are called in parallel to shorten latency. According to Theorem 2, this is not computationally expensive because at most only 2 log R threads are used for parallel "get" invocations. As long as the span of queried range is moderate, O(1) complexity for range query may be achieved.

Due to the downward load stripping mechanism described above, a "get" operation may incur additional cost if some of the intermediate node(s) 202 are saturated. This is because a client 102 has to further retrieve keys from children (child node(s) 202) of saturated nodes 202. In the worst case, this key retrieval may use up to log L steps. This is because a node 202 at a higher level in segment tree 106 is more likely to get saturated. As a result, the longer the query range 108, the more expensive the query operation. In practical cases, query range is much shorter than the whole key space (i.e., the segment tree range).

Cover Query

Insert and Remove Key Maintenances Mechanisms

A distinction between cover query 110 and range query 108 is that for cover query 220, segment tree nodes 202 now maintain information about segments instead of points. This is because simply hashing of segments from the segment tree 106 and putting to DHT would result in loss of the structural information about the segments, and hence undermine the integrity of a cover query 110. In system 100, a peer 102 first decomposes a segment from segment tree 106 into a union of minimum node intervals using the range splitting algorithm of TABLE 1. Then the node 102 inserts or removes the segment from corresponding peers 102 with a respective interval that belongs to the union. According to Theorem 2, at most 2 log R nodes 102 will be used in these operations for any given segment. Please note, unlike operations associated with range query 108 where a key is propagated to and stored at all ancestors of a corresponding leaf node 102, such operations are not necessary for cover query 110. Instead, proper propagation to children nodes 102 may be implemented for load-balancing considerations, as discussed below. In one implementation, a peer 102 implements multiple key insertion and/or removal operations in parallel.

Segment tree module 120 implements the downward load stripping mechanism to balance the load between respective nodes 102. In this implementation, a peer 102 utilizes a threshold γ to constrain the maximum number of segments 106 that a node 202 represents. Different from range query 108, a single counter is used for cover query 110. Whenever a segment is stored onto the node 202, the peer 102 increments the corresponding counter by one. If the counter for a particular node 202 reaches the threshold, the node 202 is in a saturation state. As a result, node 202 is utilized to relate the segment associated with the saturation event to children node (s) 202.

Peer 102 operations to remove a segment of segment tree 106 from node(s) 202 are analogous to insertion operations. However, due to the downward load stripping mechanism, segment tree module 120 may need to delete the segment from node(s) 202 recursively until all corresponding segments have been removed.

Due to the dual nature of a cover query 110 with respect to a range query 108, the peer 102 cover query process is very similar to the peer 102 insertion process for a range query 108. From root node 202 to a leaf node 202 there is a path on which all the nodes 202 cover the given point. (The distributed segment tree 106 also supports cover query 110 for any given segment/range). This means the segments maintained on these nodes 202 could cover the given point. Therefore, invoking DHT "get" on these nodes (in one implementation this is performed parallel) could retrieve the expected segments. If the maximum segment span is L, then log L+1 DHT "get" threads are used for the cover query 110.

An Exemplary Procedure

Figure 3:
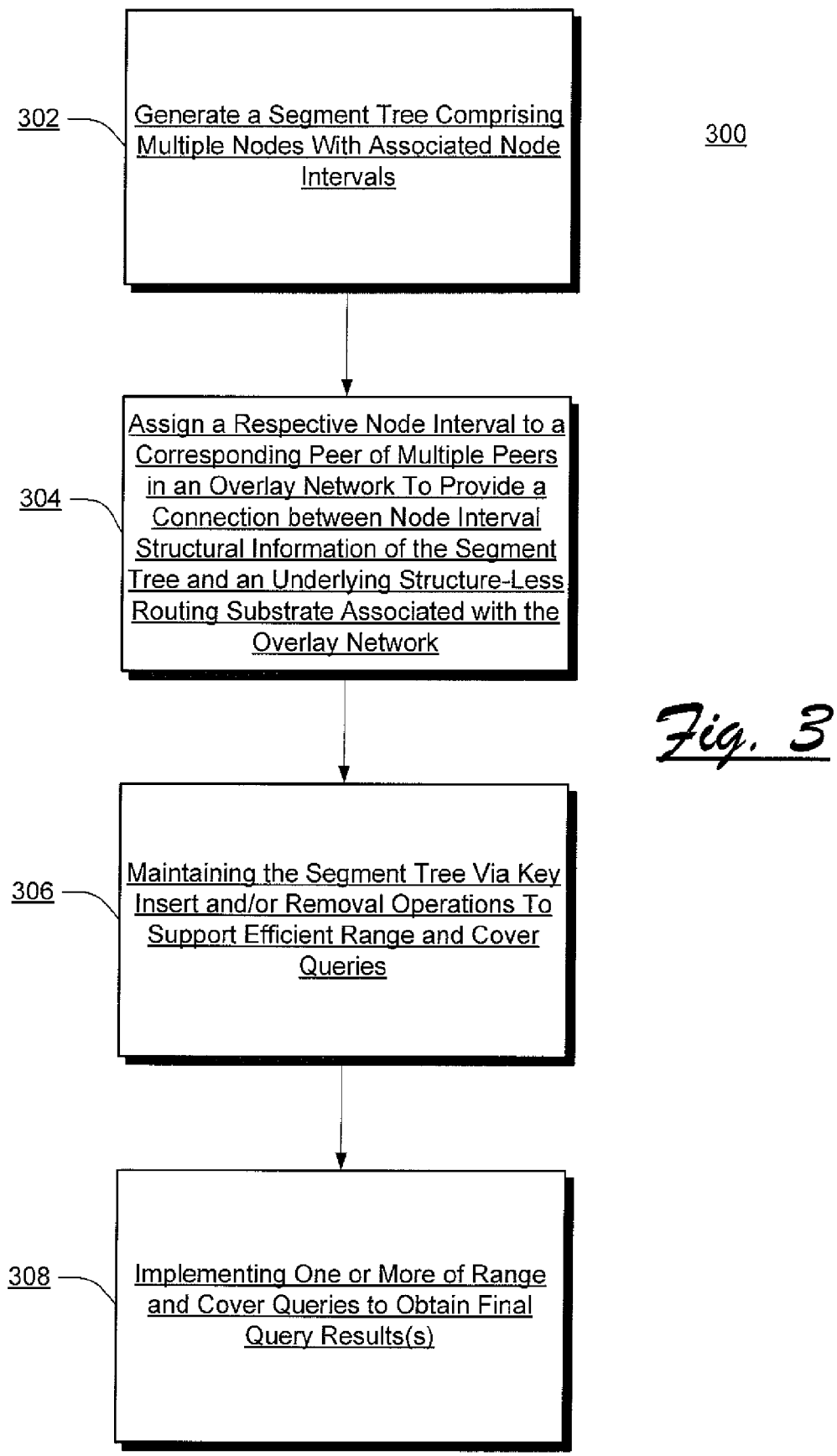
FIG. 3 shows an exemplary procedure for range and cover queries in overlay networks, according to one embodiment.

FIG. 3 shows an exemplary procedure for range and cover queries in an overlay network, according to one embodiment. For purposes of exemplary illustration and description, the operations of the procedure are described with respect to components of FIG. 1. The left-most digit of a component reference number identifies the particular Figure in which the component first appears.

At block 302, segment tree module 120 (FIG. 1) generates a segment tree 106 comprising multiple nodes 202 with associated node intervals. At block 304, segment tree module 120 delegates a respective node interval to each of one or more other peer computing devices 102 across an overlay network 104 to provide a connection between node interval structural information of the segment tree 106 and an underlying structure-less routing substrate associated with the network 104. At block 306, responsive to receiving a delegated interval and segment tree range, a peer 102 locally reconstructs the segment tree 106. At block 308, peers 102 collaborate to maintain the distributed segment tree by implementing via key insert and/or removal operations (e.g., including downward range splitting mechanisms, etc.) with respect to their locally constructed copies of the segment tree 106. At block 310, application(s) executing on one or more of the peers 102 communicate one or more of range 108 and cover 110 queries to the peers 102. At block 312, corresponding ones of the peers 102, responsive to receiving the one or more queries 108 and/or 110, generate and communicate corresponding query results to the requesting application(s).

Alternate Implementations

In one implementation, system 100 of FIG. 1 supports multi-attribute range queries 108 and cover queries 110. In this implementation, the segment tree 106 and the range splitting algorithm described above with respect to TABLE 1 is extended to multi-dimensional scenarios. To this end, a peer 102 constructs a $2^N$-branch segment tree 106 to maintain the N-D structural information, rather than using a space-filling curve to convert the N-D space into 1-D space (as in conventional systems).

In one implementation, system 100 implements cover queries 110 for a P2P file swarming application, wherein a file is divided into a large number of slices and different slices are exchanged among peers 102 to accelerate downloading processes; A file slice is typically represented by a range, between a starting position and an ending position. Given a file slice or a range of file slices to download, a cover query 110 is used by a peer 102 to; lookup other peer(s) 102 that maintain the slice or the range of slices. In another example, peers 102 implementing P2P streaming applications typically cache recently played portion(s) of a bitstream in a sliding-window manner. In this scenario, new peer 102 arrivals, or peers 102 that perform random seeks to new positions, utilize a cover query 110 to initially lookup some or all other peers 102 that have a sliding caching window covering a desired playing position. It can be appreciated that there are other applications for cover queries.

Additionally, although the above exemplary description of cover queries utilizes a single point, in another implementation, system 100 performs cover queries 110 for a range, rather than just a single point. For example, in file swarming applications, one may be missing blocks from $[k_s, k_t]$. To achieve this, there are two possibilities: (1) expand the range to a larger one in the segment tree such that it is fully contained (i.e., expand $[k_s, k_t]$ to $[k_s', k_t']$ where $[k_s', k_t']$ is a node in the segment tree 106, such that system 100 can perform parallel queries 110 from that node and all its ancestors); and (2) decompose the range into a union of some sub-ranges and perform cover query 110 for all the sub-ranges and perform a post-processing over all returned range values to retain only nodes that actually cover the range under query 110. The first technique is of lower complexity but may not return all the possible nodes that actually cover the range $[k_s, k_t]$. This is more proper in a large scale P2P system 100 where the number of returned nodes is not of critical. The second method is of higher complexity due to more queries of sub-ranges and post-processing. However, the returned results are accurate. This is more suitable for small or moderate scale P2P system 100. Since the expansion and decomposition of the range $[k_s, k_t]$ can all be computed locally by a peer 102, the application makes decision according to the "errors" (i.e., increased range) of expansion and the resulting sub-ranges of decomposition.

CONCLUSION

Although the systems and methods for range and cover queries in an overlay network have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer implemented method, the method comprising:
   generating a segment tree on multiple participating computing devices (peers) comprising one or more memory units storing computer-executable instructions executable on one or more processors, the generated segment tree comprising multiple nodes, each node of the multiple nodes having a respective node interval [s, t] of multiple node intervals, s and t being indexes to a sorted array of possible endpoints of the node intervals, each node corresponding to a particular computing device of multiple participating computing devices (peers) in an overlay network, each node interval being assigned to a peer of the peers to provide a connection between node interval structural information of the segment tree and an underlying structure-less routing substrate associated with the overlay network; and
   distributing the segment tree across the peers for query operations using a Distributed Hash Table (DHT) interface, wherein the query operations comprise cover query operations to locate each range of multiple ranges currently in the network that cover a given key and further wherein the query operations comprise range query operations with an associated range of [s, t] to find each key of multiple keys in a certain range over the network, and wherein the method further comprises:
   splitting the range with a range splitting algorithm such that the range is split into a union of minimum node intervals associated with the segment tree; and
   retrieving one or more keys maintained by corresponding peers in the network using the union of minimum node intervals a DHT get operation; and wherein a final query result is a union of the one or more keys returned.

2. The method of claim 1, wherein the query operations further comprise one or more of:
   range query operations to find each key of multiple keys in a certain range over the network; and
   cover query for a range.

3. The method of claim 1, wherein the query operations comprise queries of sub-ranges that are executed in parallel.

4. The method of claim 1, wherein generating further comprises:
   for each node of the multiple nodes, allocating a respective node interval [s, t] of the node intervals to the node; and
   for each node interval, assigning the node interval to a peer of the peers.

5. The method of claim 1, wherein the method further comprises balancing load on nodes in the segment tree across levels using a downward load stripping mechanism that reduces redundancy embedded in the segment tree.

6. The method of claim 1, wherein the method further comprises:
   inserting a given key to a specific leaf node in the segment tree;
   inserting the given key to all ancestors of the leaf node; and wherein the leaf node is identified using DHT lookup operations.

7. The method of claim 1, wherein the method further comprises:
   removing a key from a leaf node and all ancestors of the leaf node, the segment tree comprising the leaf node and the ancestors, the leaf node being identified based on DHT; and
   responsive to the removing, if a node transitions from saturation to un-saturation:
   attempting to recruit an additional key from any child nodes to the node; and if no additional key is recruited, marking the node as unsaturated.

8. The method of claim 1, wherein the method further comprises:
   supporting one or more of multi-attribute range and cover queries by extending the range splitting algorithm to multi-dimensional scenarios such that a 2N branch segment tree is utilized to maintain N-D structural information.

9. The method of claim 1, wherein the query operations are cover query operations, and wherein the method further comprises one or more of inserting and removing segments associated with the segment tree from one or more corresponding peers.

10. The method of claim 9, further comprising:
   decomposing a segment of the segments into a union of minimum node intervals using a range splitting algorithm; and
   implementing one or more of the inserting and removing the segments with a respective interval belonging to the union of minimum node intervals.

11. A computer-readable memory unit comprising computer-program instructions that when executed by a processor perform acts comprising:
   receiving a segment tree range and a delegated interval from a peer computing device of multiple peer computing devices in an overlay network, each peer computing device comprising one or more memory units storing computer-executable instructions executable on one or more processors, the delegated interval having been assigned in view of a particular key, the delegated interval providing a connection between node interval structural information of the segment tree and an underlying structure-less network routing substrate, wherein the segment tree supports query operation comprising cover query operations to locate each range of multiple ranges currently in the network that cover a given key; and
   responsive to receiving the segment tree range and the delegated interval reconstructing a segment tree with multiple nodes, each node representing a respective node interval [s, t] of multiple node intervals, each integer s and t corresponding to an index to a sorted array of possible endpoints of the node intervals, the segment tree also having been constructed by the peer computing device, wherein the query operations comprise range query operations with an associated range of [s, t] to find each key of multiple keys in a certain range over the network, and wherein the computer-program instructions further comprise instructions for:
   splitting the range with a range splitting algorithm such that the range is split into a union of minimum node intervals associated with the segment tree;
   retrieving one or more kegs maintained by corresponding peers in the network using the union of minimum node intervals a DHT get operation; and
   wherein a final query result is a union of the one or more keys returned.

12. The computer-readable memory unit of claim 11, wherein the segment tree supports query operations further comprising: range query operations to find each key of multiple keys in a certain range over the network; and cover query for a range.

13. The computer-readable memory unit of claim 11, wherein the query operations comprise queries of sub-ranges that are executed in parallel.

14. The computer-readable memory unit of claim 11, wherein the computer-program instructions further comprise instructions for balancing load on nodes in the segment tree by reducing redundancy across levels of the segment tree.

15. The computer-readable memory unit of claim 11, wherein the computer-program instructions further comprise instructions for:
   inserting the key to a specific leaf node in the segment tree;
   inserting the key to all ancestors of the leaf node; and
   wherein the leaf node is identified using DHT lookup operations.

16. The computer-readable memory unit of claim 11, wherein the query operations are cover query operations, and wherein the computer-program instructions further comprise instructions for one or more of inserting and removing segments associated with the segment tree from one or more corresponding peers.

17. A computing device comprising:
   one or more memory units storing computer-executable instructions executed on one or more orocessors:
   query support means, executable on the one or more processors, to support cover queries over a DHT network, wherein query support means includes cover query operations to locate each range of multiple ranges currently in the DHT network that cover a given key; and
   segment tree maintenance means, executable on the one or more processors, to implement one or more of insert and remove key operations in a segment tree that supports cover query,
   wherein query operations comprise range query operations with an associated range of [s, t] to find each key of multiple keys in a certain range over the network, and wherein the computing device further comprises:
   splitting the range with a range splitting algorithm such that the range is split into a union of minimum node intervals associated with the segment tree;
   retrieving one or more keys maintained by corresponding peers in the network using the union of minimum node intervals a DHT get operation; and
   wherein a final query result is a union of the one or more keys returned.

18. The computing device of claim 17, wherein the query support means also comprises means to support range queries over the DHT network, and wherein the segment tree maintenance means aiso comprises means to implement one or more of insert and remove key operations in a segment tree that supports range query.

* * * * *